May 9, 1939.  F. MacCALLUM  2,157,961
MEANS FOR ATTACHING PASTE TO THE PLATES OF ELECTRIC BATTERIES
Filed Sept. 28, 1936  7 Sheets-Sheet 1

Frank MacCallum
Inventor

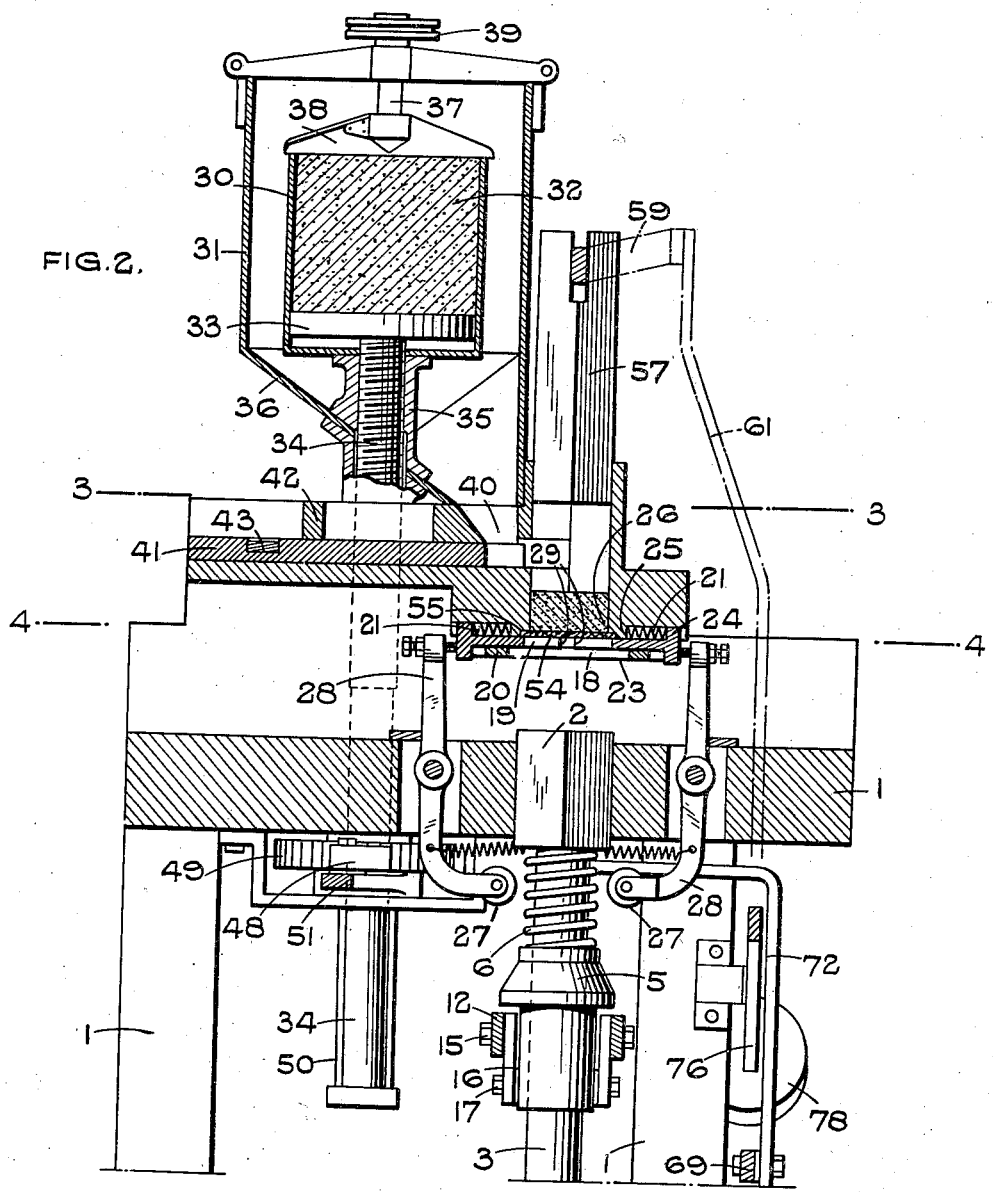

May 9, 1939. F. MacCALLUM 2,157,961
MEANS FOR ATTACHING PASTE TO THE PLATES OF ELECTRIC BATTERIES
Filed Sept. 28, 1936 7 Sheets-Sheet 3

Frank MacCallum
Inventor.

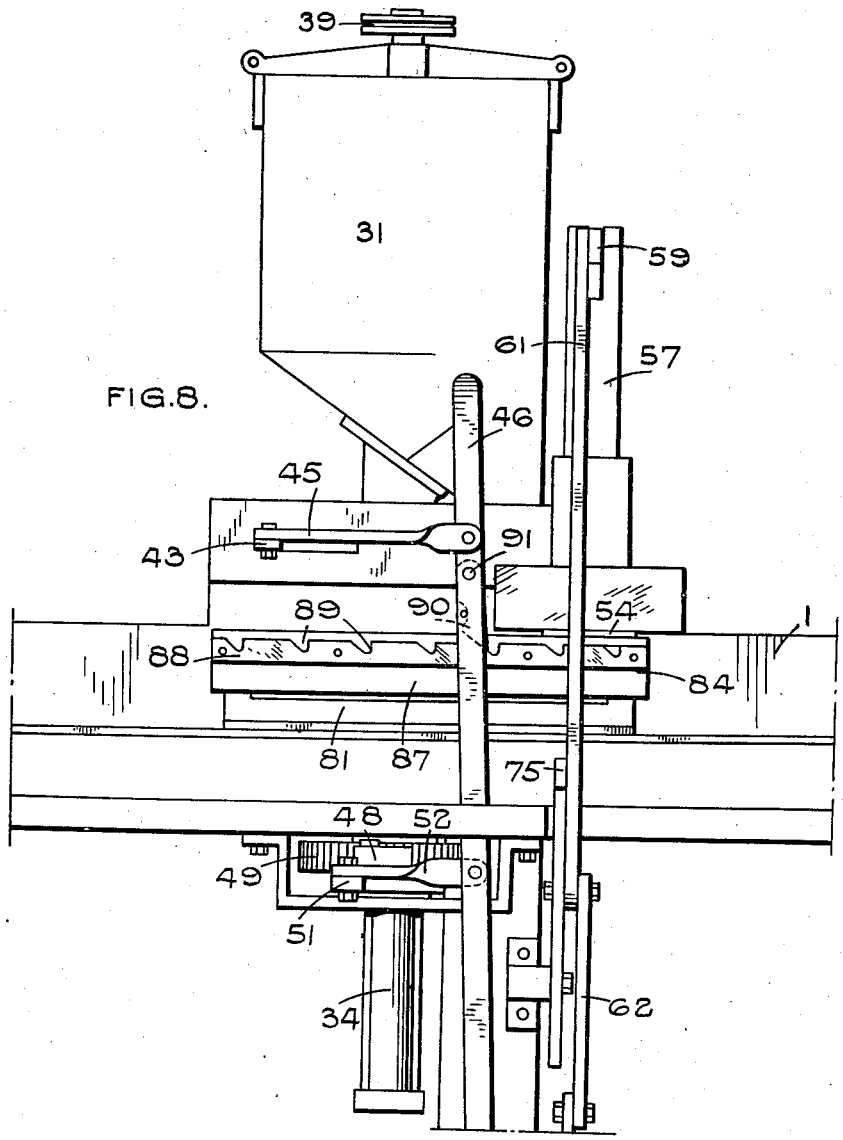

May 9, 1939.  F. MacCALLUM  2,157,961
MEANS FOR ATTACHING PASTE TO THE PLATES OF ELECTRIC BATTERIES
Filed Sept. 28, 1936   7 Sheets-Sheet 5

Frank MacCallum
Inventor.
Attorneys.

May 9, 1939.   F. MacCALLUM   2,157,961
MEANS FOR ATTACHING PASTE TO THE PLATES OF ELECTRIC BATTERIES
Filed Sept. 28, 1936   7 Sheets-Sheet 6

Frank MacCallum
Inventor.
Saulnier & Saulnier
Attorneys.

May 9, 1939.                F. MacCALLUM                2,157,961
MEANS FOR ATTACHING PASTE TO THE PLATES OF ELECTRIC BATTERIES
                    Filed Sept. 28, 1936          7 Sheets-Sheet 7
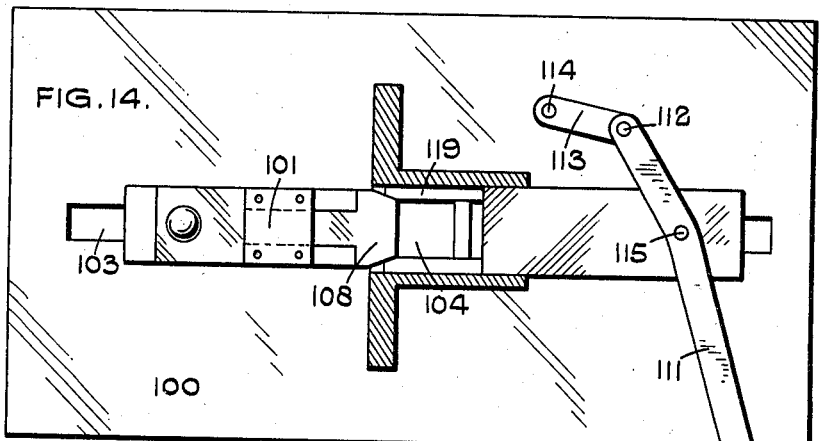
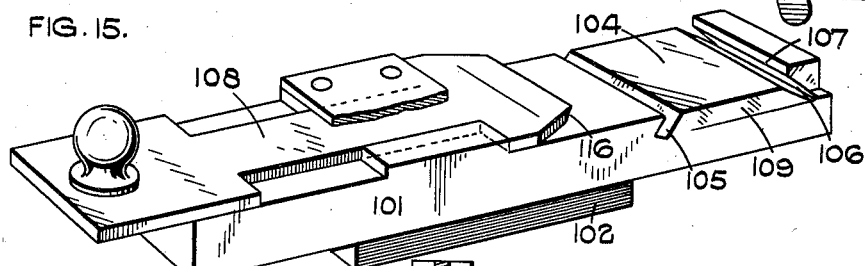
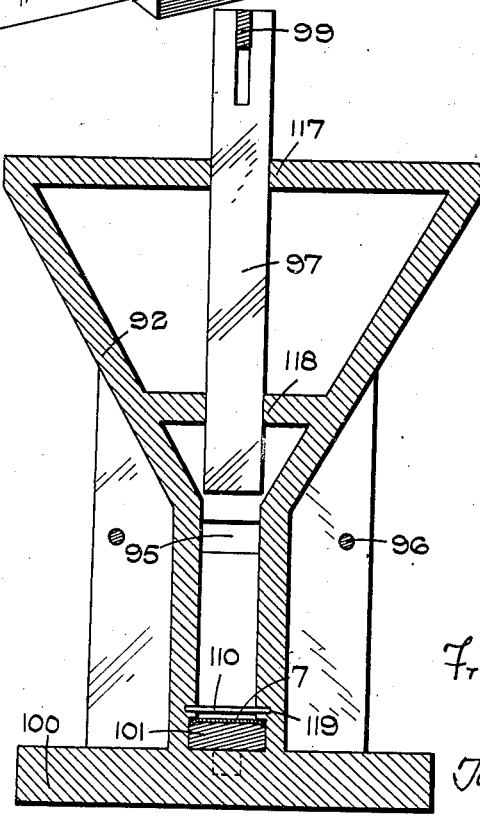
Frank MacCallum
        Inventor.
Saulnier & Saulnier
        Attorneys.

Patented May 9, 1939

2,157,961

UNITED STATES PATENT OFFICE 2,157,961

MEANS FOR ATTACHING PASTE TO THE PLATES OF ELECTRIC BATTERIES

Frank MacCallum, Washwood Heath, Birmingham, England, assignor to Maxolite Holdings Limited, London, England Application September 28, 1936, Serial No. 103,046
In Great Britain April 26, 1934

6 Claims. (Cl. 18—5)

The present invention is concerned with the problem of handling depolariser paste and attaching it to the plates of electric dry batteries. The present invention provides a means of attaching a cake of the depolariser paste to the carbon coated plate by means of pressure sufficient to ensure that the paste will adhere firmly thereto, so as to produce an intimate and lasting surface contact despite any inequalities, distortion, or subsequent movement of the metal of the plate, thus enabling the plate carrying the depolariser to be handled by unskilled persons subsequently without danger of the depolariser crumbling or dropping off.

The paste employed is in a mechanically unstable form and usually comprises grains of manganese dioxide, graphite and/or carbonaceous matter, and one or more liquids, such paste constituting a depolariser.

According to the present invention, I provide a means of attaching depolariser paste to carbon coated plates for use in the manufacture of dry batteries, wherein the paste is forced on to one surface of a plate while the opposite surface of the plate is engaged by a support, the paste being supported at its edges during the pressing operation by a mould collar or frame, from which the plate and the paste which it bears are subsequently disassociated.

According to a further feature of this invention, a quantity of depolariser paste equal to that required for a plurality of plates is forced by a reciprocating plunger through a delivery tube or passage, whereby the paste is subjected whilst in the tube or passage to a plurality of compressing operations. This results in the plates being provided with a coating of depolariser paste which is of substantially uniform texture and uniformly compressed.

One result of my machine for applying the depolariser material to the plates is that perfect contact is obatined between the material and the plate, and the adhesion is so good that the material and the plate can be handled as one unit when assembling the cells to form a battery.

Another result of the compression of the material produced by the successive operations of the plunger thereon is that the material in the delivery end of the delivery tube or passage adheres to the walls of the tube or passage, so that it is not absolutely necessary to provide a support below it when the carriage or plate is removed.

The invention further consists in a machine for use when carrying into practice the said method.

Such machine comprises a hopper or container for receiving depolariser paste, a reciprocable plunger working in guide means and adapted to deliver depolariser paste through a delivery passage, means for feeding the depolariser paste from said hopper or container into position in the path of the plunger, a mould or collar disposed to receive said paste on delivery from said passage by the plunger, such mould or collar having an opening corresponding in area and shape with the working face of the said plunger, means for supporting the plate to receive the depolariser and adapted for movement relative to the said discharge passage to dispose the plate in and remove it from the paste-receiving position, such supporting means being adapted to withstand the pressure of the plunger, and cutting off means being provided on the apparatus to sever the depolariser forced on to the plate from that in the delivery passage. Alternatively, such machine comprises a hopper, a delivery tube or passage, means for conveying the depolariser from the hopper to this tube or passage, a feed member or plunger which operates in the delivery tube or passage, a carriage having means for carrying a battery plate and adapted to move to a position adjacent the end of the delivery tube or opening, means independent of, or movable in relation to, the carriage and plate, for supporting the edges of the material adjacent the plate, and a knife adapted to sever a layer of the material which is propelled through the delivery tube or passage by the feed member or plunger, the shape and size of the area enclosed by said supporting means being equal to those of the cross section of the delivery tube and working face of the plunger.

The mould or collar may be formed with a movable side or sides to permit of easy extraction of the plate when the paste has been attached thereto.

Although, as stated above, it is not absolutely necessary to provide means adapted to move across and close the end of the delivery tube or passage during the period while the carriage is withdrawn, such means are preferably provided, and means are also preferably provided for automatically withdrawing the closure means when the carriage brings a fresh plate into the loading position.

The cutting means or knife may operate to close the delivery tube and to support the material therein after the cutting means or knife has severed a layer of the material, and while the carriage carrying the loaded plate is withdrawn so that the loaded plate can be removed and a fresh plate inserted.

The carriage for the plate may be formed as a horizontal slide adapted to bring the plate under the delivery tube, or in an alternative arrangement the carriage for the plate may be arranged as a vertical slide disposed directly beneath the delivery opening so that the plate is brought up to the delivery opening, and after receiving the material is lowered from the delivery opening. In such an arrangement, moving side walls may be provided which are brought into position over the upper surface of the plate so as to form a definite mould for receiving the material. By making use of this expedient we find that the tablet or slab of material deposited on to the plate is produced with sharply defined edges, very little waste or "spew" being formed.

The laterally moving side walls may be operated automatically from the operating gear which is used for raising and lowering the carriage, and the arrangement may be such that the initial movement brings the slide up to a definite level, and further movement of the operating gear brings the side walls into position over the upper surface of the plate.

A container for the material to be fed may be placed in the hopper, and the material may be expelled from the upper part of this container into the hopper. The expelling means may take the form of a piston in the lower part of the container which is automatically raised by a screw or the like periodically in order to keep a supply of the material in the lower part of the hopper.

At the top of this container a positively driven rotating knife may be provided for driving the material outwardly from the edges of the container.

Referring to the drawings:

Figure 2 is a sectional front view of a part of the machine shown in Figure 1.

Figure 8 is a front view of the construction shown in Figure 7.

Figure 13 is a section on the line 13—13 of Figure 11.

Figure 14 is a sectional view on line 14—14 of Figure 11.

Figure 15 is a perspective view of the carriage used in the construction shown in Figures 11 to 14.

Figure 1:
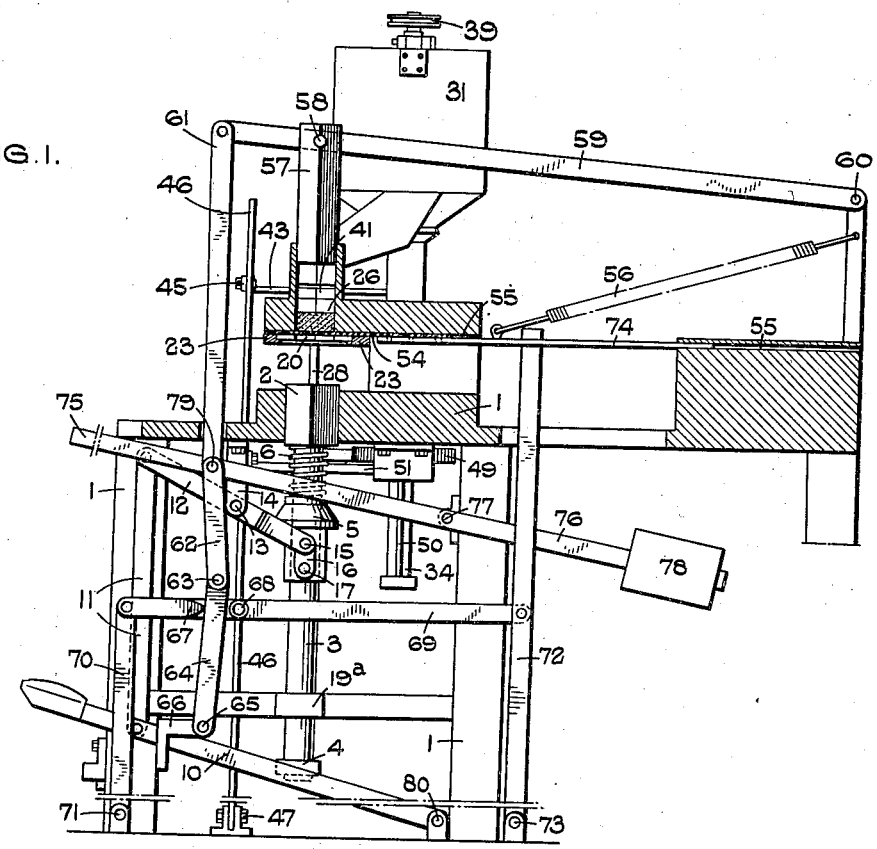
Figure 1 is a view in side elevation partly in section, showing one construction.
Figure 7:
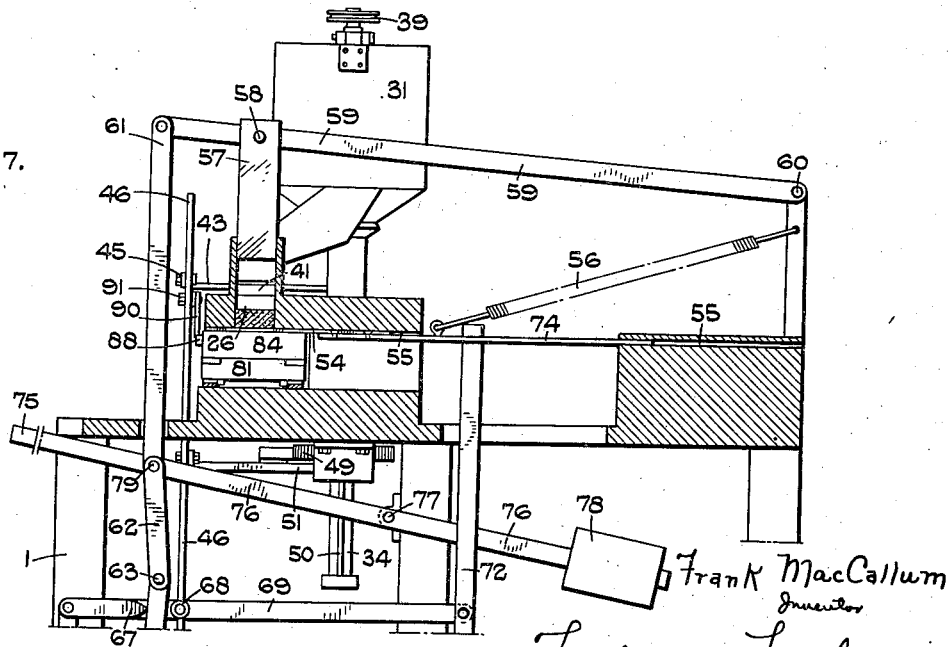
Figure 7 is a sectional side view showing another construction.

Referring to Figures 1 to 6, the machine comprises a suitable frame 1 in which is mounted for vertical sliding movement a carriage 2. The carriage 2 is mounted on a vertically sliding shaft 3 having a fixed collar 4 and a conical cam 5. The cam 5 is slidably mounted on the shaft 3, and a compression spring 6 is placed between the upper end of the cam and the lower end of the carriage 2.

Figure 6:
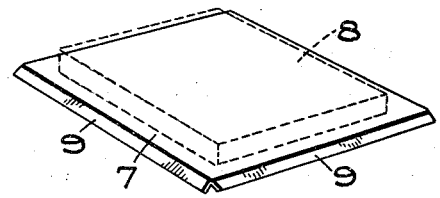
Figure 6 is a perspective view showing one of the plates with the material delivered thereon shown in dotted lines.
Figure 9:
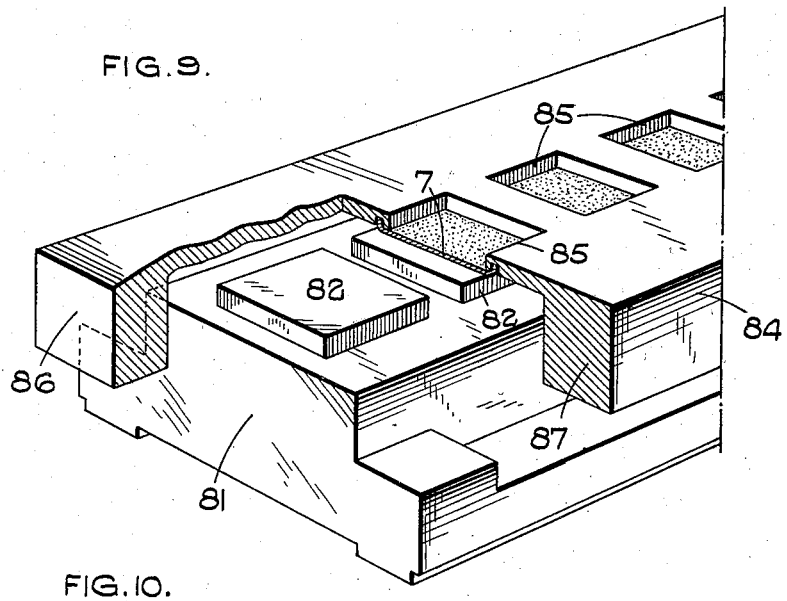
Figure 9 is a perspective view showing the carriage employed in the machine shown in Figures 7 and 8.
Figure 10:
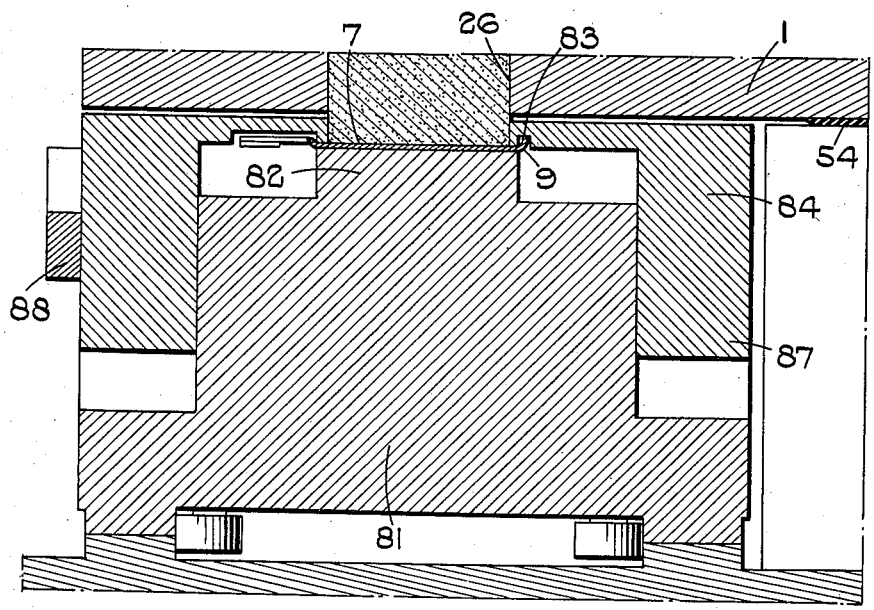
Figure 10 is a transverse sectional view of the carriage.
Figures 11, 12:
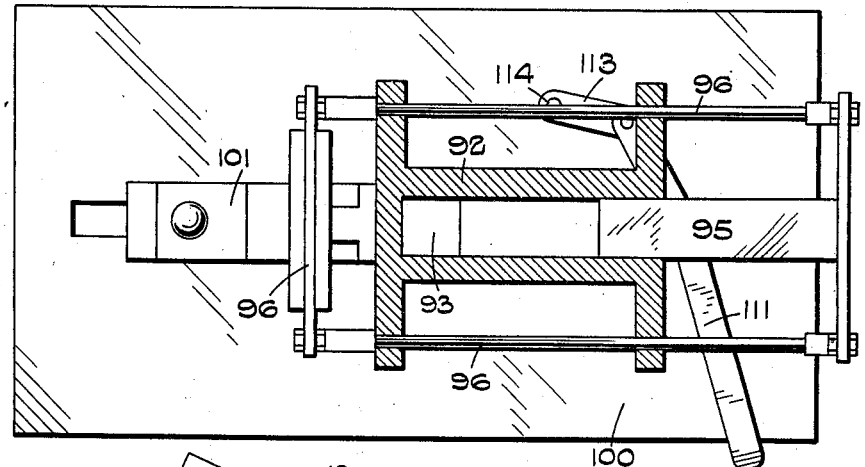
Figure 11 is a sectional side view showing a further construction.
Figure 12 is a horizontal section taken above the pusher of Figure 11.

The upper surface of the carriage 2 is adapted to carry a plate such as 7 upon which the material indicated at 8 is to be fed. In Fig. 6 the plate is shown with down-turned edges 9, but this is not essential. If the down-turned edges are provided, they serve to position the plate upon the top of the carriage 2, but when they are not provided, the upper surface of the carriage 2 may have a shallow recess for receiving the plate.

An operating lever 10 is provided. In the construction shown, the operating lever 10 is a pedal but this is not essential. This lever is connected by a link 11 to a lever 12 pivoted at 13 to a fixed bracket 14, and the opposite end of the lever 12 is pivoted at 15 to a link 16 pivotally connected at 17 to the cam 5.

When the pedal lever 10 is depressed, the sliding shaft 3, together with the cam 5 and the carriage 2, is raised until the upper surface of the plate on the top of the carriage 2 has been raised to the level indicated at 18. When the carriage 2 and its associated parts have reached this position, further upward movement of the shaft 3 is prevented by the collar 4 coming into contact with the cross beam 19a of the frame.

In order to provide a definite mould for receiving the material and to confine the material to the centre part of the plate, laterally moving side walls 19 are provided. These walls 19 are formed by sliding plates 20, the plates being mounted for horizontal sliding movement, and when moving inwardly against the pressure of springs 21 (see Figure 2), the plates 20 are mounted in suitable guide-ways 23 and the springs 21 are placed between the shoulders 24 on the plates and shoulders 25 formed adjacent to the delivery opening 26 for the material. Normally the springs 21 will force the plates 20 outwardly, but after the plate 7 has been raised to the receiving position, further movement of the operating lever 10 raises the cam 5 to engage the rollers 27 carried by levers 28 and rocks the levers 28 so as to move the slides 20 inwardly towards each other until their edges 29 come into contact.

The material to be fed on to the plate is placed in a container 30 and the container is located in a hopper 31. The material 32 rests upon a piston 33 carried by a screw shaft 34. The screw shaft engages a fixed nut 35 in the sloping base 36 of the hopper, and the screw shaft 34 is turned periodically so as to raise the piston 33 and expel some of the material 32 from the top of the container 30.

Rotatably mounted on the shaft 37 and above the top of the container 30 is a knife having one or more radial blades (two are shown) 38. The shaft 37 may be driven by a belt engaged on the pulley 39, the belt being driven from any convenient source of power.

Thus, when the piston 33 is raised, some of the material is pushed upwardly and is engaged by the blade or blades 38 and delivered over the edges of the container, such material dropping on to the sloping base 36 of the hopper and passing into the throat 40.

Figure 5:
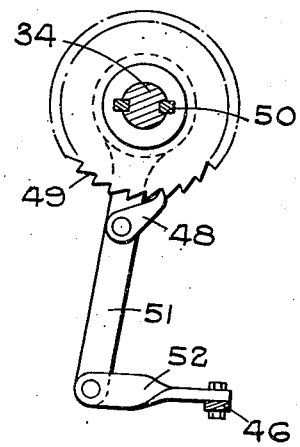
Figure 5 is a detail view showing the drive for the piston of the container.

The screw 34 may be turned periodically by the means shown in Figure 5, which means incorporate an oscillating lever 51 carrying a pawl 48, the pawl engaging a ratchet wheel 49 mounted on the screw 34 in such manner that it can drive the screw but will not partake of the endwise movement of the screw, the ratchet wheel 49 being mounted upon feathers 50.

Movably mounted beneath the throat 40 is a pusher 41, this pusher being adapted to slide on guides 42 and being operated periodically by a lever 43 pivoted at 44. The lever 43 is rocked periodically by hand by means of a link 45 connected to a hand lever 46 pivoted at 47. The lever 46 may also be connected by a link 52 to the lever 51 so that the screw 34 will be advanced each time the pusher 41 is operated.

Figure 3:
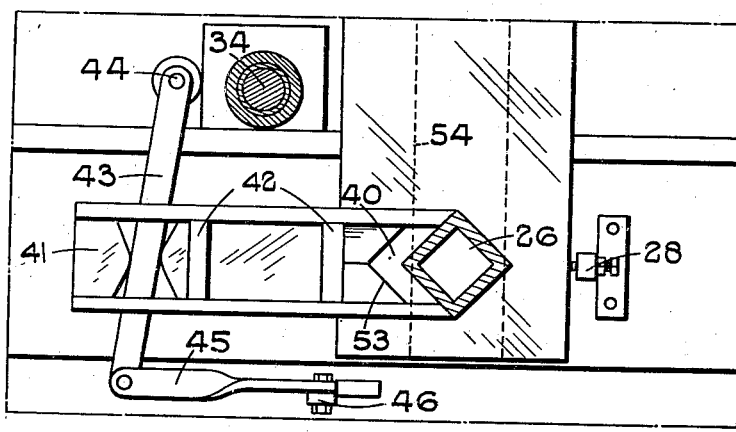
Figure 3 is a section on the line 3—3 of Figure 2.
Figure 4:
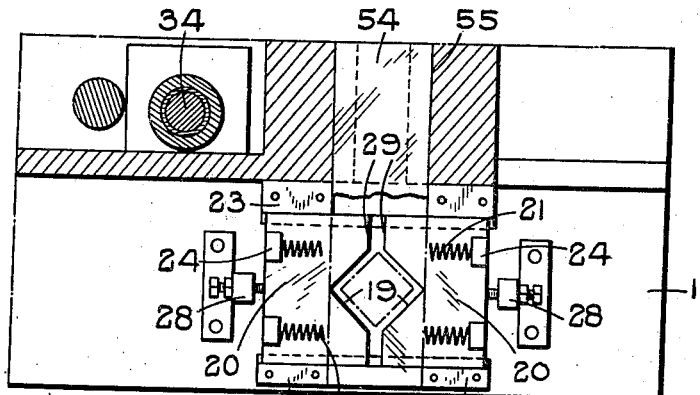
Figure 4 is a section on the line 4—4 of Figure 2.

At its forward end 53 the pusher is shaped to correspond with one half of the sectional shape of the delivery passage 26 as shown in Figure 3, and when the pusher is advanced beneath the throat 40 it pushes some of the material into the delivery passage 26.

Normally when no plate such as 7 is in position, the material in the passage 26 is supported on the knife 54. This knife 54 slides in guideways 55 and is acted upon by a spring 56.

Mounted above the delivery opening so that it can slide therein is a plunger 57. This plunger is pivotally connected at 58 to a lever 59, the lever 59 being pivoted at 60. The lever 59 is connected by a link 61 to a link 62, and the link 62 is pivotally connected at 63 to a link 64, the lower end of which is pivoted at 65 to a fixed bracket 66.

The link 64 passes between a projection 67 and a roller 68 both on the side of a link 69 connecting a lever 70 pivoted at 71 and a further lever 72 pivoted at 73, the upper end of the lever 72 engaging in an opening in a slide 74 to which the knife 54 is attached.

The arrangement is such that when the lever 59 is moved downwardly by the handle 75, the link 64 moves to the right (see Figure 1), engages the roller 68, pushes the lever 72 to the right and withdraws the knife 54 from the delivery passage 26. The material in the delivery passage is then pushed down on to the plate by the plunger 57 which moves downwardly as soon as the knife has been withdrawn.

The lever 75 is raised, the knife is returned to the position shown in Figure 1 and so cuts off the material, leaving a definite thickness of material on the plate and supporting the remainder of material in the delivery passage 26.

The lever system operated by the lever 59 may be balanced by means of a balancing lever 76 pivoted at 77, carrying a balance weight 78 and connected at 79 to the links 61 and 62.

In operation the plate to receive the material is placed on the top of the carriage 2 and is raised by pressing down the pedal lever 10 which is pivoted at 80. This raises the plate 2 to a definite position as already indicated, and further downward movement of the pedal lever 10 brings the side walls 19 into position. The lever 46 may now be operated to operate the pusher 41 and screw 34, in order to ensure that material is brought into the delivery passage 26. After this the lever 75 is operated to cause the knife 54 to withdraw and the plunger 57 to descend so as to fill the mould which has been formed above the plate by the side walls 19. After the mould has been filled in this way, the plunger 57 moves upwardly and a knife 54 advances over the top of the mould to sever the material on the plate from that which is to remain in the delivery opening 26.

In the modification shown in Figures 7 to 10, the container, hopper, plunger, knife and associated parts are constructed as already described with reference to Figures 1 to 6, but a different form of carriage is employed. In this construction the carriage consists of a lower member 81 having a number of projections 82, each adapted to receive one of the plates such as 7. In this case if the plates have turned-over edges such as 9, they are placed so that the edges are projecting upwardly and the plate may be positioned by the edges 9 engaging in slots 83 in an upper member 84.

The upper member 84 has a series of openings 85, one for each of the projections 82, and at its ends and sides the upper member 84 has downwardly projecting parts 86 and 87 which definitely position it on the lower member.

With this arrangement a number of the plates such as 7 may be loaded on to the member 81, and the upper member 84 is then placed in position thereon, the openings 85 in the upper member forming moulds for receiving the material.

As will be seen from Figure 8, upon its front side the carriage formed by the members 81 to 87 is provided with a rack 88 on its side, and this rack is provided with a number of spaced ratchet-like notches 89 adapted to be engaged by a pawl 90 pivoted at 91 to the lever 46. This arrangement allows the lever 46 in addition to operate the pusher 41 and the screw 34 to move the carriage one step each time it is rocked so as to bring a fresh plate into position.

The plates are, of course, brought successively under the lower end of the delivery passage and loaded with the material.

The openings 85 in the upper member 84 form moulds for receiving the material, and they may correspond in size and shape with the delivery end of the delivery tube. The knife 54 moves between the upper surface of the member 84 and the under surface of the end of the delivery tube.

A further construction is shown in Figures 11 to 15, and in this case a simpler form of hopper is used, the hopper being indicated at 92, the hopper containing a delivery passage 93 and a throat 94 in which operates a pusher 95. The pusher is mounted for sliding movement in one of the walls of the hopper and is operated manually by a stirrup-like structure 96.

The delivery passage 93 contains a plunger 97 pivoted at 98 to the lever 99. Slidably mounted on the base 100 is the carriage 101 which is shown in perspective in Figure 15. The carriage 101 has a downward projection 102 which slides in a recess 103 in the base, and on its upper surface the carriage is provided with a plate receiving facing 104, adjacent to which are two inclined slots 105 and 106. Above the slot 106 is an overhanging shoulder 107.

In order to keep the plate in position on the facing 104, the carriage is provided with a manually operated slide 108, the arrangement being such that a plate placed on the facing 104 is located and held in a definite position by advancing the slide 108.

If the plate used is similar to that shown in Figure 6, the down-turned edges 9 are accommodated by the slots 105 and 106, and at the other two sides of the facing 104 inclines such as 109 may be provided.

In this construction the knife is shown at 110 and is operated by means of a lever 111 pivoted at 112 to a link 113, the link being pivoted to the base at 114. The lever 111 is pivotally connected at 115 to the knife or knife carrier 110.

In operation the plate is placed on the facing 104 and is locked in position by advancing the slide 103, the forward edge 116 of which may be under-cut as shown. The carriage 101 is then advanced to bring the plate under the delivery passage 93. It should be observed that the delivery passage 93 although similar in shape to the plate, is of smaller dimensions so that only the centre part of the plate will receive the material. The carriage 101 is pushed forward by hand to bring the plate into position, and the knife 110 is retracted by the lever 111. While the knife is retracted, the lever 99 is operating, bringing the plunger 97 downwardly. The plunger is guided in a pair of bars 117 and 118 fixed to the hopper. When the plunger is brought downwards, the material is pushed on to the plate, and after the plunger has been raised by hand, the knife is brought forwards to sever the material on the plate from that which is to remain in the delivery passage. A suitable supply of material is fed to the delivery passage by operating the pusher 95 periodically as may be required.

The lower part of the delivery tube 93 is provided at opposite sides with shoulders 119 which serve to mask two portions near opposite edges of the plate. The portions adjacent the other two edges of the plate are masked respectively by the parts 116 and 107 on the slide.

Although I have described and illustrated machines in which the material is fed downwardly through a vertical delivery tube or passage, it is to be understood that the material may be fed upwardly, or the tube or passage may be placed horizontally or in an inclined position if desired.

Further, although I have shown machines having a single delivery tube and associated parts, it is to be understood that the machine may be constructed with a plurality of delivery tubes and associated parts if desired.

What I claim then is:

1. A machine for attaching depolariser paste to dry cell plates, comprising a hopper, a container within the hopper for holding the paste, said container having an opening, means within the container for expelling the paste out of this opening into the hopper at a controlled rate, a delivery tube of cross sectional area corresponding with that of the layer of paste to be applied to the plates, said delivery tube having an opening communicating with said hopper and having an open end through which the paste is fed, a plunger mounted for reciprocating movement in said tube to force the paste towards the open end, said plunger being operable to subject the paste to a plurality of compacting and compressing impulses in said tube prior to delivery therefrom, means for supporting a dry cell plate near the open end of said tube, said plunger being operable to force through the open end of said tube a sufficient quantity of said compacted paste and to press said paste into adhering contact with one surface of said plate, a mould for supporting the edges of said layer of paste during said pressing operation, and a knife, operable between said mould and the open end of said tube, for severing the paste.

2. A machine according to claim 1, comprising a rotary blade for pushing the paste over the upper edge of the container.

3. A machine for attaching depolariser paste to dry cell plates, comprising a hopper, a container within the hopper for holding the paste, said container having an opening, a screw-operated piston within the container for expelling the paste from the container into the hopper, a delivery tube of cross sectional area corresponding with that of the layer of paste to be applied to the plates, said delivery tube having an opening communicating with said hopper and having an open end through which the paste is fed, a plunger mounted for reciprocating movement in said tube to force the paste towards the open end, said plunger being operable to subject the paste to a plurality of compacting and compressing impulses in said tube prior to delivery therefrom, a movable carriage for supporting a dry cell plate near the open end of said tube, said plunger being operable to force through the open end of said tube a sufficient quantity of said compacted paste and to press said paste into adhering contact with one surface of said plate, a mould for supporting the edges of said layer of paste during said pressing operation, said mould being in a plurality of parts, means for withdrawing said parts from the edges of the paste on the plate, a knife, operable between said mould and the open end of said tube, for severing the paste, and co-ordinated operating means for the screw, the plunger, the carriage, the knife and the parts of the mould.

4. A machine for attaching depolariser paste to dry cell plates comprising a hopper for said paste, means for discharging said paste from said hopper uniformly in small quantities, a delivery tube of cross sectional area corresponding with that of the layer of paste to be applied to the plates, said delivery tube having an open end through which the paste is delivered, means for feeding into said tube said small quantities of paste discharged from said hopper, mechanically operated compressing means for compacting said small quantities of paste in said tube and subjecting said paste to a plurality of compressing and compacting impulses in said tube, means for supporting a dry cell plate beneath the delivery end of said tube, said compressing means being operable to force from said tube a quantity of the compressed and compacted paste and for pressing said paste into adhering contact with one surface of said plate, means for severing from the body of the paste in the tube the layer of paste adhering to said plate so as to form a unitary electrode-depolariser element and means for operating in synchronism said discharge means associated with said hopper, said feeding means and said compressing means to feed to said delivery tube a fresh quantity of paste corresponding with the amount forced from the delivery end of the tube and to compact said fresh quantity on said column to maintain a uniform column length.

5. A machine for attaching depolariser paste to dry cell plates comprising a hopper for said paste, means for discharging the paste from said hopper in uniform and small quantities, a delivery tube of cross sectional area corresponding with that of the layer of paste to be applied to the plates, said delivery tube having an open end through which the paste is delivered, a laterally movable pusher for feeding to said delivery tube the small quantities of paste discharged from said hopper, a plunger mounted for reciprocating movement in said tube to compact the paste into a homogeneous column in said tube, a movable carriage for supporting a dry cell plate adjacent the open end of said tube, said plunger being operable to force through the open end of said tube a sufficient quantity of said compacted paste and to press said paste into adhering contact with one surface of said plate, a mould for supporting the edges of the paste on the plate, means for severing the paste within the mould from the paste within the tube and means for operating in synchronism said discharge means associated with said hopper, said laterally movable pusher and said plunger to feed to said tube a fresh quantity of paste corresponding with the amount forced from the delivery end of said tube and to compact said fresh quantity on said column to maintain a uniform column length.

6. A machine for attaching depolariser paste to dry cell plates comprising a hopper for said paste, means for discharging the paste from said hopper in uniform and small quantities, a delivery tube of cross sectional area corresponding with that of the layer of paste to be applied to the plates, said delivery tube having an open end through which the paste is delivered, a laterally movable pusher for feeding to said delivery tube the small quantities of paste discharged from said hopper, a plunger mounted for reciprocating movement in said tube to compact the paste into a homogeneous column in said tube, a movable carriage for supporting a dry cell plate adjacent the open end of said tube, means for moving said carriage in a direction parallel to the plane of the end of said delivery tube, means for moving said carriage towards and away from the end of said delivery tube, said plunger being operable to force through the open end of said tube a sufficient quantity of said compacted paste and to press said paste into adhering contact with one surface of said plate, a mould for supporting the edges of said paste during said pressing operation, said mould being in a plurality of parts, means for severing the paste from within the mould from the paste within the tube to form a unitary electrode-depolariser element, means for withdrawing said mould parts from the edges of the paste on the plate, said pusher and said plunger being operable in synchronism to feed to said tube a fresh quantity of paste corresponding with the amount forced from the delivery end of said tube and to compact said fresh quantity on to said column to maintain a uniform column length and co-ordinated operating means for the discharge means associated with said hopper, said movable pusher, said plunger, said carriage, said mould parts and said severing means.

FRANK MacCALLUM.